(12) United States Patent
Feik

(10) Patent No.: US 9,259,134 B1
(45) Date of Patent: Feb. 16, 2016

(54) MOBILE WASH BASIN SUPPORT

(71) Applicant: Frederick Feik, Maple Plain, MN (US)

(72) Inventor: Frederick Feik, Maple Plain, MN (US)

( * ) Notice: Subject to any disclaimer, the term of this patent is extended or adjusted under 35 U.S.C. 154(b) by 0 days.

(21) Appl. No.: 14/304,024

(22) Filed: Jun. 13, 2014

(51) Int. Cl.
*B60B 1/00* (2006.01)
*A47L 13/50* (2006.01)

(52) U.S. Cl.
CPC ........................ *A47L 13/50* (2013.01)

(58) Field of Classification Search
CPC ........................................................ B62B 1/00
USPC ........................................................ 280/638
See application file for complete search history.

(56) References Cited

U.S. PATENT DOCUMENTS

| 4,219,186 | A | * | 8/1980 | Brewer | 254/9 C |
| 4,908,904 | A | | 3/1990 | Smith, Jr. | |
| 5,671,933 | A | | 9/1997 | Tucker | |
| 6,976,286 | B1 | | 12/2005 | Sanabria | |
| 7,198,007 | B2 | * | 4/2007 | Bestelmeyer | 119/673 |
| 7,568,667 | B1 | | 8/2009 | Feik et al. | |

* cited by examiner

*Primary Examiner* — John Walters
*Assistant Examiner* — James Triggs
(74) *Attorney, Agent, or Firm* — Peter J. Ims; Westman, Champlin & Koehler, P.A.

(57) ABSTRACT

An apparatus is configured for attachment to a tub having a bottom wall and a plurality of wheels extending from the bottom wall. The apparatus includes a plurality of dual-hinged actuating mechanisms, a platform, and a handle. At least some of the plurality of actuating mechanisms include a first member configured to be fixedly positioned relative to the bottom wall; a second member; and a movable member comprising first and second ends, the first end hingedly attached to the first member and the second end hingedly attached to the second member. The second member is also attached to the platform. The handle is fixed to the movable member and is movable in an arcuate path. An assembly including the apparatus and a tub is also described.

14 Claims, 5 Drawing Sheets

MOBILE WASH BASIN SUPPORT

BACKGROUND

For cleaning floors and other tasks, professional custodial personnel typically use large wash basins that hold several gallons of water and/or cleaning solution. A typical wash basin has casters or wheels to allow the wash basin to be easily moved to a selected location. The wash basin can also include a wringer that removes excess water from a mop after being rinsed in the wash basin.

Due to the weight of the water or cleaning solution in the wash basin, the casters or wheels are necessary to move the wash basin from one location to another location. However, the casters or wheels also cause the wash basin to move as the mop is being rinsed in the wash basin or the mop is being wrung out.

The movement of the wash basin while rinsing the mop or wringing the mop can cause the custodial personnel to be inefficient. Further, in some instances, the movement of the wash basin can place the custodial personnel in awkward positions that could lead to an injury.

Further, sloshing of the liquid within the wash basin while rinsing the mop or wringing the mop has a tendency to cause the casters or wheels to roll, which can cause spillage. The spillage requires additional cleaning time, which causes unnecessary inefficiencies while washing a floor.

SUMMARY

In one aspect, an apparatus is configured for attachment to a tub having a bottom wall and a plurality of wheels extending from the bottom wall. The apparatus comprises a plurality of dual-hinged actuating mechanisms, a platform, and a handle. At least some of the plurality of actuating mechanisms comprise a first member configured to be fixedly positioned relative to the bottom wall; a second member; and a movable member comprising first and second ends, the first end hingedly attached to the first member and the second end hingedly attached to the second member. The second member is also attached to the platform. The handle is fixed to the movable member and is movable in an arcuate path.

In another aspect, an apparatus is configured for placement upon a ground surface. The apparatus comprises a tub having a bottom wall and a plurality of wheels extending from the bottom wall; a plurality of dual-hinged actuating mechanisms; a platform; and a handle. At least some of the plurality of actuating mechanisms comprise a first member configured to be fixedly positioned relative to the bottom wall; a second member; and a movable member comprising first and second ends, the first end hingedly attached to the first member and the second end hingedly attached to the second member. The second member is also attached to the platform. The handle is fixed to the movable member and is movable in an arcuate path.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter.

Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Figure 1:
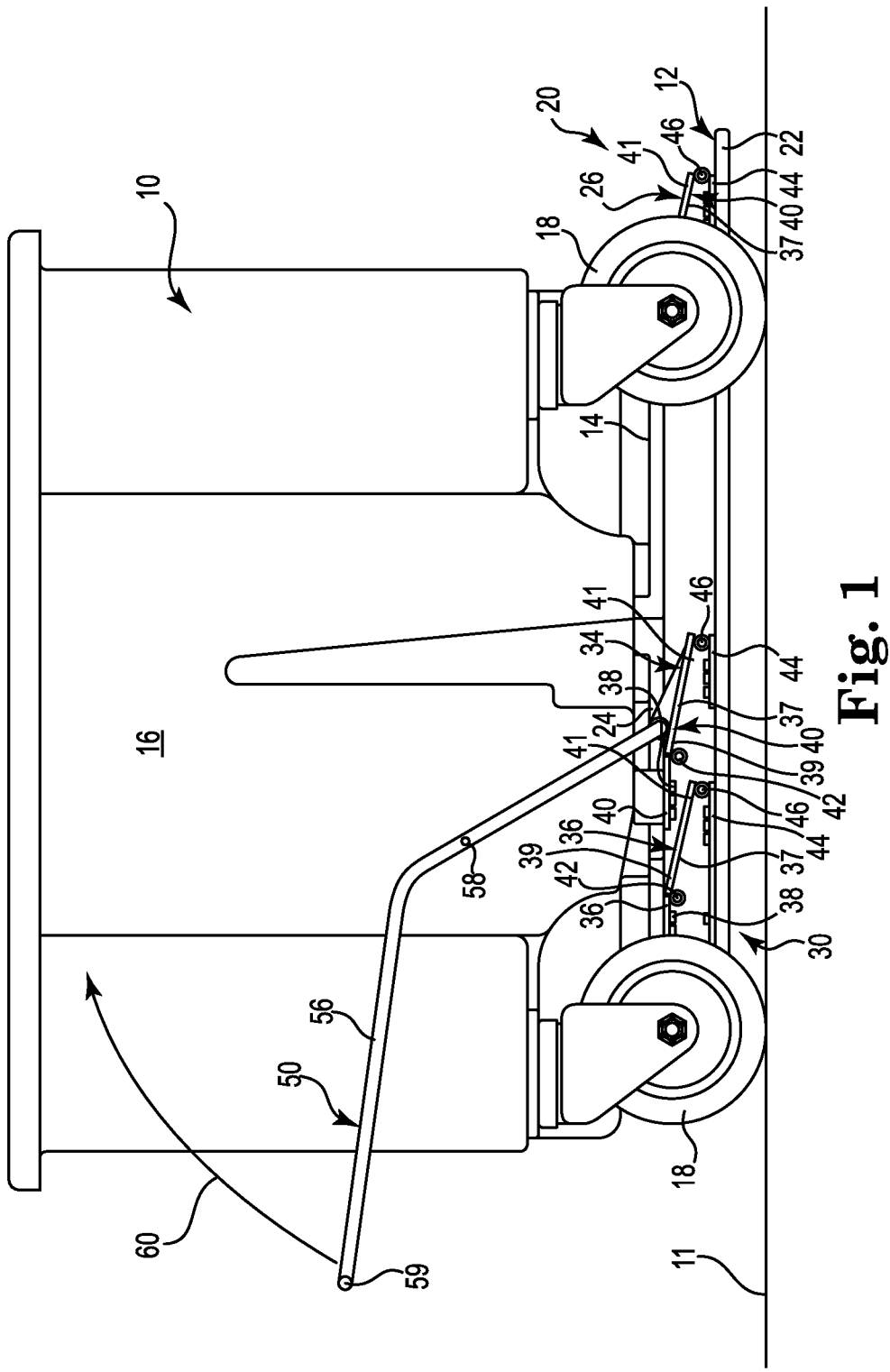
FIG. 1 is a side elevation view of a wash basin used with an exemplary mobile support, wherein a platform of the support is retracted so that the wheels of the wash basin contact the ground.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure relates to a mobile support for a wash basin, wherein the wash basin typically has casters or wheels. More particularly, the support is operable so that casters or wheels can be lifted from the floor so that the wash basin will be supported on a platform that rests upon the floor.

In an exemplary embodiment, the mobile support attaches to a bottom surface of the wash basin and includes an actuator assembly that is pivotally attached to a platform. The platform has a length that is substantially similar to a length of the bottom surface such that the platform is capable of stably retaining the wash basin in a stationary, selected position. The actuator assembly is pivotally attached to both the platform and the bottom surface and includes a plurality of actuating members. In an exemplary embodiment, each actuating member is in the form of a dual-hinged mechanism.

In an exemplary embodiment, the plurality of actuating members include a pair of actuating members proximate a front end of the bottom surface; a pair of actuating members proximate a back end of the bottom surface; and an intermediate pair of actuating members located proximate a mid-plane of the bottom surface and a mid-plane of the platform. In an exemplary embodiment, a handle is fixedly attached to the intermediate set of actuating members. The handle is moveable with manual force from a first position to a second position. In the first position shown in FIGS. 1 and 3, the platform is elevated above the floor surface and the casters or wheels support to the wash basin. In the second position shown in FIGS. 2, 4 and 5, the platform engages the floor surface and lifts the casters or wheels above the floor surface such that the wash basin is retained in a substantially stationary location.

The wash basin typically has casters, wheels or rollers at opposite ends thereof and proximate opposing side edges to provide stability while moving the basin across the supporting floor surface easily with manual force to a selected position. The actuator assembly, which attaches the platform to the bottom surface of the wash basin, is positioned into the first position such that the platform does not interfere with the casters or wheels. Once the wash basin is in the selected location, the actuator assembly is moved from the first position to a second position by moving a handle with manual force such that the platform engages the floor surface and lifts the wash basin such that the casters or wheels no longer contact the floor surface. The handle has a sufficient amount of weight or mass, as well as an appropriate configuration, to act as a counterweight. The actuator system is thereby prevented from moving from the second position back toward the first position unintentionally.

In an exemplary embodiment, the actuator assembly includes pairs of front and rear actuating members positioned on opposite ends of the wash basin. The actuator assembly includes an intermediate pair of actuating members positioned substantially along a mid-plane of the wash basin and between the pairs of front and rear actuating members. A handle is fixedly attached to the intermediate pair of actuating members such that rotational movement of the handle causes corresponding motion in each of the pairs of actuating members. The pairs of actuating members are mounted to pivot simultaneously with the rotational movement of the handle. The actuating members move together as they are pivoted to lower and raise the platform from the first position to the second position and back. The pivoting actuating members have sufficient lengths so that the casters or rollers on the wash basin will be raised off the ground in the second position and the casters or wheels will support the wash basin on the ground surface in the first position.

As shown in FIGS. 1-5, an exemplary wash basin has a tub 10 and wheels 18 extending from a bottom wall 14 of tub 10. FIG. 1 is a side elevation view of a tub 10 used with an exemplary mobile support 12, wherein a platform 22 of the support 12 is retracted so that the wheels 18 of the tub 10 contact the ground surface 11. The tub 10 has a bottom wall panel 14 and a continuous upright side wall 16 that extends from a perimeter of the bottom wall panel 14. The bottom wall 14 and the continuous side wall 16 define a volume into which a cleaning liquid can be poured and retained.

The tub 10 can be of any size and shape that can retain a washing liquid and be attached to mobility-enhancing members such as casters, wheels, or rollers. In the illustrated embodiment wherein the tub 10 has a generally rectangular perimeter or cross-section, the tub 10 typically includes four casters or wheels 18 that are positioned proximate the four corners 19 of the bottom wall 14 (see, for example, FIGS. 3-5). However, the present disclosure can also be utilized with a basin having three or more casters or wheels 18. The casters or wheels 18 allow the tub 10 to be moved with manual force from one location to another, even when the basin 10 is filled with a cleaning liquid. The casters or rollers 18 can be attached to the tub 10 with any desired fasteners (such as caster mounting pins, for example) and are shown schematically in receptacles such as wheel wells 21 formed (such as by molding, for example) on tub 10.

Figure 2:
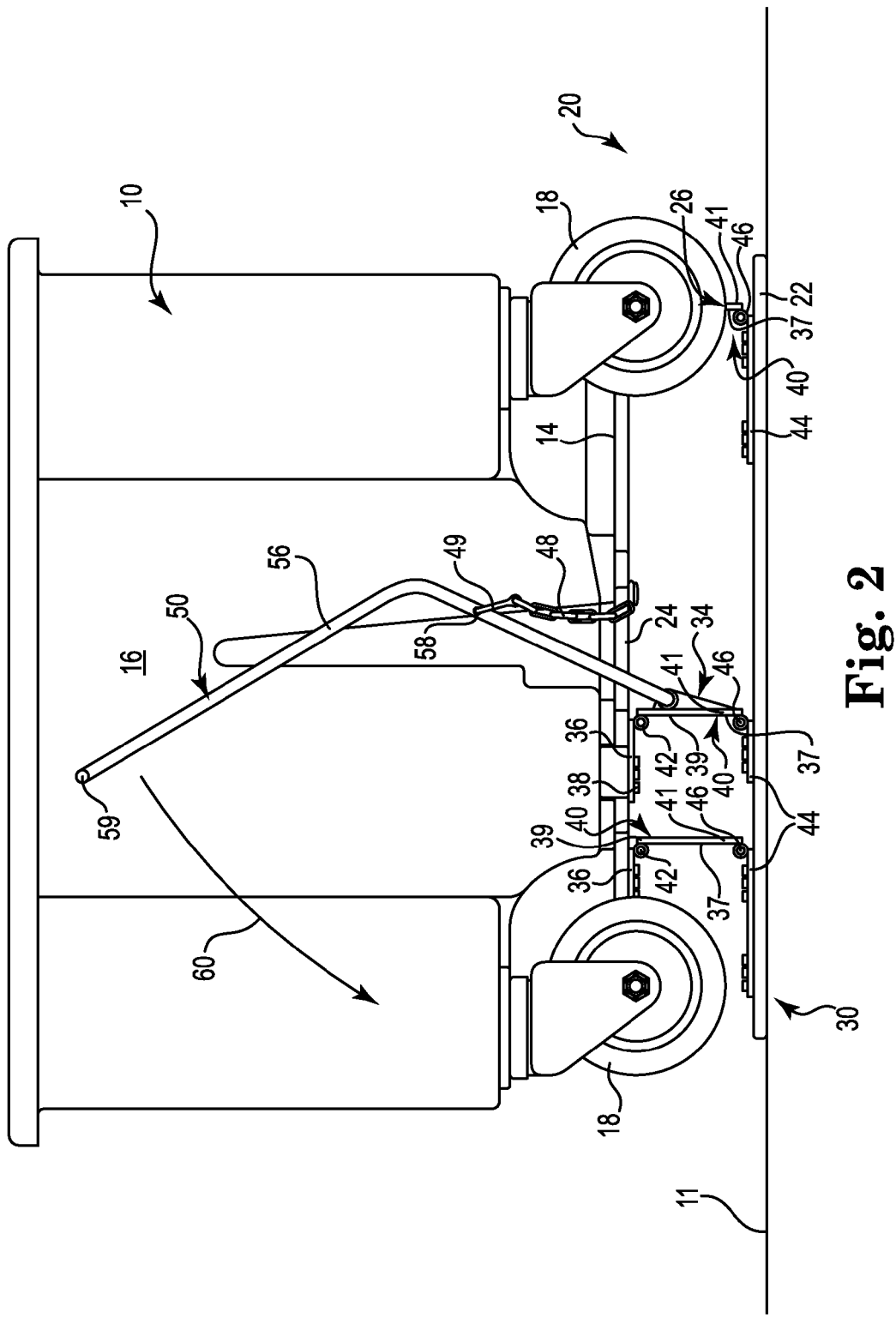
FIG. 2 is a side elevation view of the wash basin and mobile support, wherein a platform of the support is fully extended so that the wash basin stably rests upon the platform, which contacts the ground.

The present disclosure includes an actuator assembly 20 that pivotally connects a platform 22 to the bottom wall 14 of the tub 10. The actuator assembly 20 is moveable from a first position that elevates the platform 22 above a contact point of the casters or wheels 18 with a floor surface 11 (as illustrated in FIG. 1) to a second position where the platform 22 engages the floor surface and elevates the tub 10 such the casters or wheels 18 do not contact floor surface 11 (as illustrated in FIG. 2). In the illustrated embodiment, actuator assembly 20 includes six actuating members 40, which are separated into a front pair of actuating members 26, an intermediate pair of actuating members 34 and a rear pair of actuating members 30.

A plate 24 is typically fixedly attached to the bottom wall 14 of the tub 10 to provide structural integrity, especially to a basin 10 molded from a polymeric material. The plate 24 provides additional strength to the bottom wall 14 to withstand the forces and moments that are imparted to the bottom wall 14 as the actuating mechanism 20 manipulates the platform 22 from the first position to the second position and back.

Figure 3:
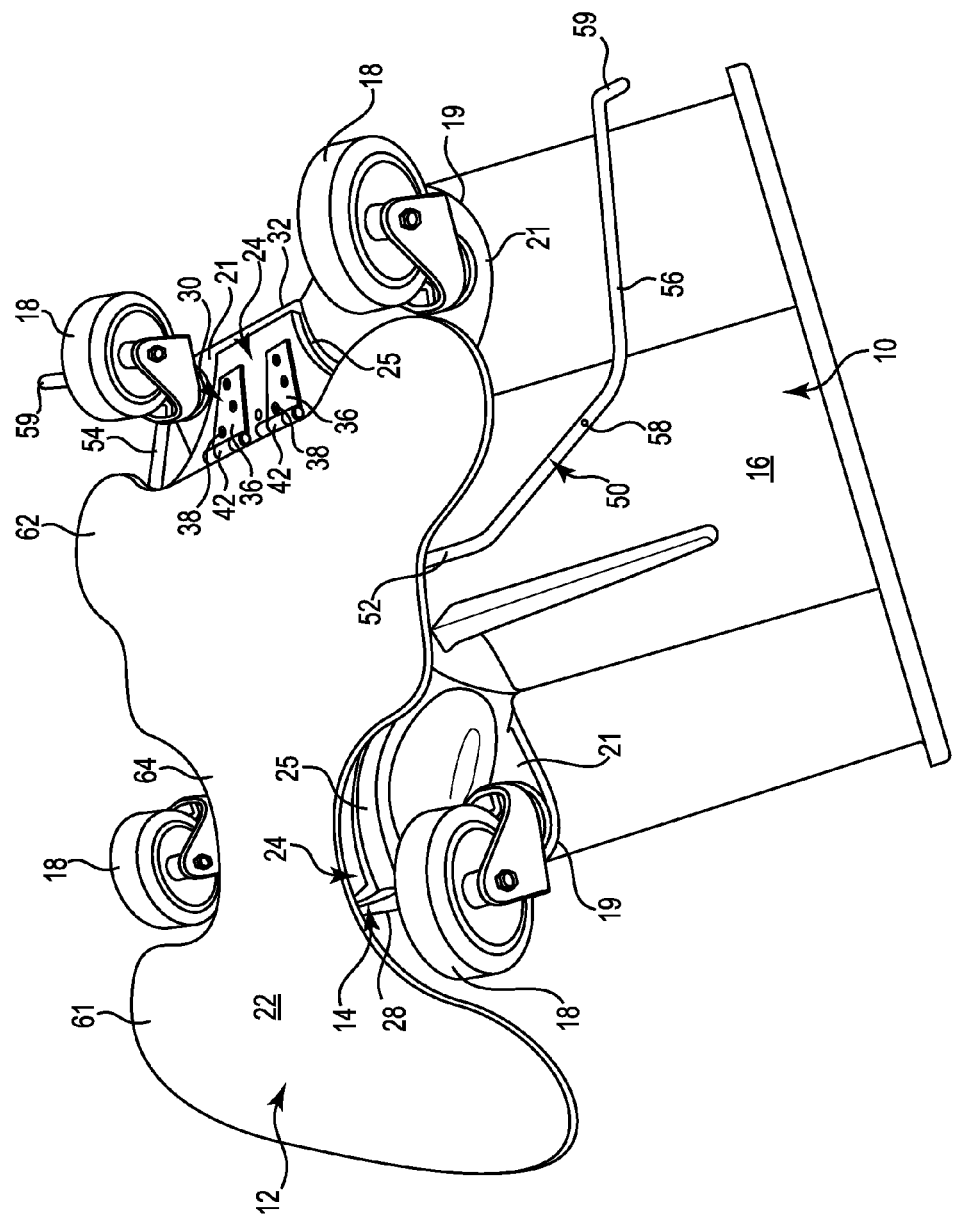
FIG. 3 is a bottom perspective view of an upside-down wash basin in the configuration of FIG. 1.
Figure 4:
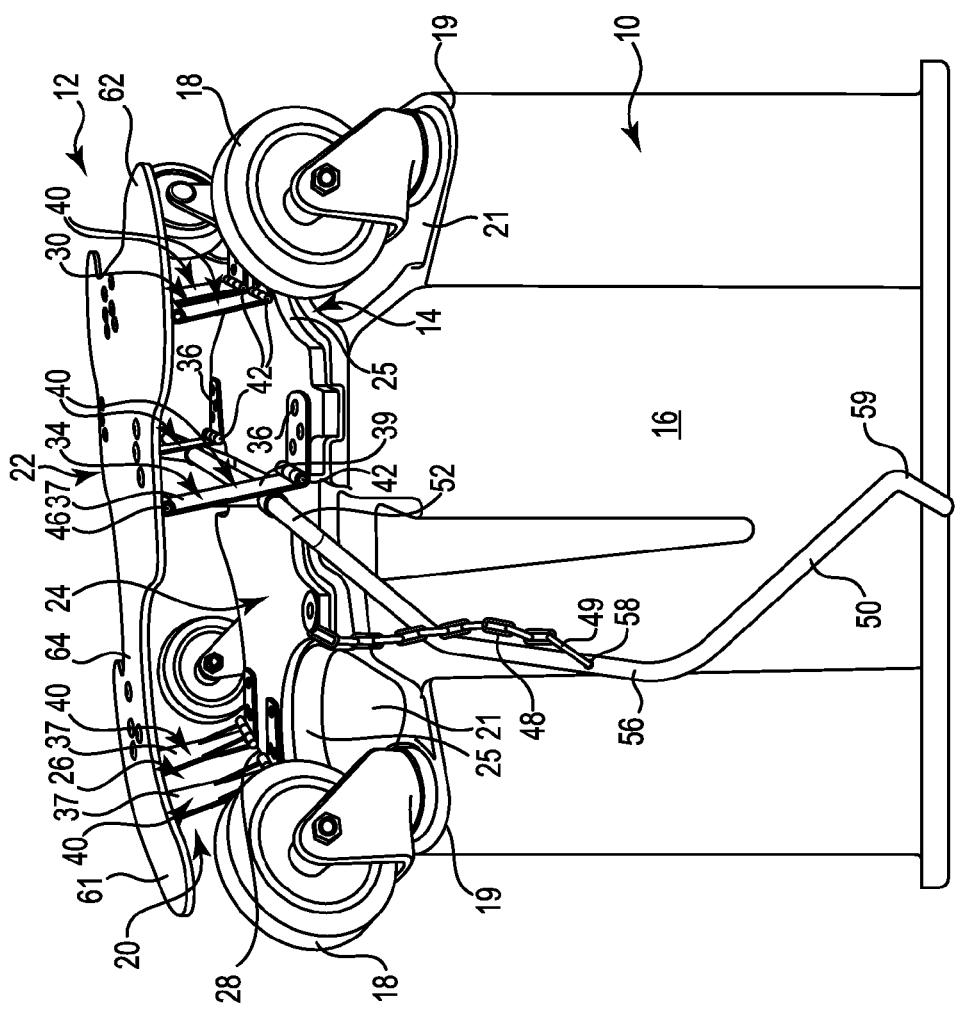
FIG. 4 is a side perspective view of an upside-down wash basin in the configuration of FIG. 2.
Figure 5:
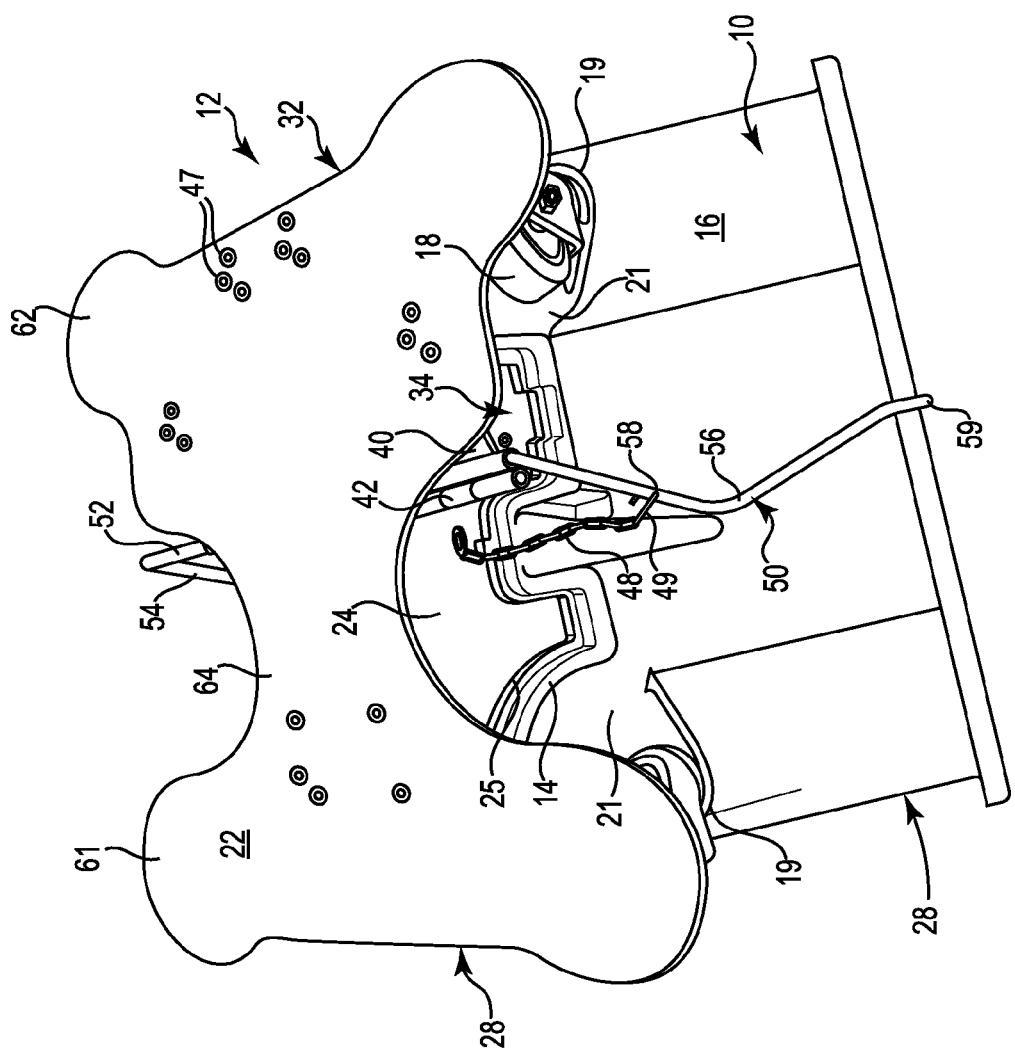
FIG. 5 is a bottom perspective view of an upside-down wash basin in the configuration of FIGS. 2 and 4.

The plate 24 is typically constructed to be flush with the bottom wall 14 so that the forces and moments imparted on the plate 24 are evenly distributed across the bottom wall 14 and are not concentrated in a particular area. As shown in FIGS. 3-5, the plate 24 has cut out portions 25 proximate the corners 19 to accommodate wheel wells 21 into which the casters or wheels 18 are secured.

While the plate 24 is illustrated with the cut outs 25 for the wheel wells 21, one skilled in the art will recognize that the shape of the plate 24 can be configured to fit a bottom wall 14 of other wash basins 10. In an exemplary embodiment, the plate 24 provides the necessary strength to the bottom wall 14 to withstand the forces and moments created through movement of the actuator assembly 20. In an exemplary embodiment, plate 24 is constructed of metal; however, other materials are also contemplated, including high-density polymers. Additionally, tub 10 itself may be modified, for example by increasing the thickness of the bottom wall 14 so that the actuator assembly 20 can be attached directly to bottom wall 14 without using plate 24.

The actuating assembly 20 includes a plurality of dual-hinged actuating mechanisms or members 40. In the illustrated embodiment, the actuating members 40 are grouped into a first set 26 of spaced apart actuating members 40 located proximate a front end 28 of the bottom wall 14; a second set 30 of spaced apart actuating members 40 located proximate a back end 32 of the bottom wall 14; and a third set 34 of spaced apart actuating members 40 located between the first and second sets 26, 30 of spaced apart actuating members. In an exemplary embodiment, the third set 34 of spaced apart actuating members is attached to the plate 24 and to the platform 22 typically along a mid-plane substantially parallel to the front and back ends 28 and 32, respectively, of the bottom wall.

In an exemplary embodiment, each of the actuating members 40 of the pairs of actuating members 26, 30 and 34 is similarly constructed. Each actuating member 40 of the pair of actuating members 26, 30 and 34 includes a first member 36 that includes a plurality of apertures that aligns with a plurality of apertures in the plate 24 such that a fastener 38 such as a flat head screw or rivet can be inserted therethough to secure the first member 36 to the plate 24. First member 36 is thereby fixedly positioned relative to bottom wall 14 of tub 10.

A first end 39 of a movable member 37 of an actuating member 40 is secured to an end of the first member 36 with a hinge 42. The hinge 42 is configured to allow the movable member 37 to move from a substantially horizontal position when the platform 22 is in the first position (shown in FIG. 1) to a substantially vertical position when the platform 22 is in the second position (shown in FIG. 2).

A second end 41 of the movable member 37 is secured to an end of a second member 44 with a hinge 46. The second member 44 includes a plurality of apertures that aligns with apertures in the platform 22 such that a fastener 47, such as a rivet for example, can be utilized to secure the second member 44 to the platform 22. While the first and second members 36 and 44 are illustrated as being secured with rivets, other fasteners can also or alternatively be used.

Similar to the hinge 42, the hinge 46 is configured to allow the movable member 37 to move from the substantially horizontal portion to the substantially vertical position. A length of the movable member 37 is sufficient so that as the actuating member 40 is moved to the vertical position (shown in FIG. 2), the casters or wheels 18 are elevated from the floor surface 11 through the engagement of the platform 22 with the floor surface 11. In other words, the movable member 37 has a length that allows the platform 22 to extend from the bottom wall 14 by a greater distance than a distance the wheels 18 extend from the bottom wall 14 when mobile support 12 is attached to the tub 10.

As best seen in FIG. 5, a generally U-shaped handle 50 includes a middle portion 52 that is fixedly secured to movable member 37 of the actuating members 40 of the intermediate set of actuating members 34. The middle portion 52 has a length that is greater than a width of the basin 10 such that left and right handle portions 54 and 56 that extend from ends of the middle portion 52 can be manipulated without interference with the side wall 16 of the basin 10.

Manual force can be applied to either or both of the left and right handle 54, 56 to move the handle portion 54 or 56 in an arcuate path 60. As manual force is applied to the handle portion 54 and/or 56, the force is imparted to the actuating members 40 of the intermediate set of actuating members 34, thereby causing the actuating member to move via the pivotal movement of the hinges 42 and 46. The pivotal movement of the actuating members 40 of the intermediate set of actuating members 34 causes the platform 22 to move from the first position shown in FIG. 1 to the second position shown in FIG. 2 and back.

In an exemplary embodiment, the second members 44 of each actuating member 40 of the pairs of actuating members 26, 30 and 34 are secured to the platform 22 and the first members 37 are secured to plate 24. Thus, the manual force imparted through the handle portions 54 and/or 56 to the movable members 37 of the intermediate pair of actuating members 34 is transferred to the first and second sets of actuating members 26 and 30 through the platform 22 and plate 24, such that all the actuating members 40 of sets 26, 30 and 34 move in unison.

The platform 22 is retained in the first position, shown in FIG. 1, by the weight of the handle portions 54 and 56, which act as a counterweight. The gravitational force on handle portions 54, 56 thereby prevents unintentional movement of handle 50 long arcuate path 60. The handle 50 is typically constructed from a solid metal rod. However, it is also contemplated to utilize a tubular material that has a weight at the end 59 of the handle portions 54 and 56 to provide the counterweight. In the illustrated embodiment, each end 59 extends substantially perpendicularly from handle portion 54, 56.

In an exemplary embodiment, the platform 22 is retained in the second position, shown in FIG. 2, by the weight of tub 10 on actuator assembly 20. Additionally or alternatively, a locking mechanism is contemplated to retain the platform 22 in either the first, elevated position or the second, floor engaging position (in which the casters or wheels 18 are elevated). For example, as illustrated in FIGS. 2, 4 and 5, chain 48 is attached to plate 24 at one end and has hook 49 at the other end. Hook 49 in an embodiment can be engaged with aperture 58 in handle 50 to serve as a lock mechanism for the second position. Such a lock mechanism may be provided on one or both of left and right handle portions 54, 56. While a particular hook mechanism is illustrated, it is contemplated that other lock and latch devices can also be used.

As shown in FIGS. 3-5, the platform 22 has a first end portion 61 that has a width similar to the width of the basin 10 and a second end portion 62 that also has a width similar to the width of the basin 10. The first and second end portions 61 and 62 are connected with an intermediate portion 64 that is configured to fit between wheels 18 in the retracted position, as shown in FIG. 3. As shown in FIGS. 2 and 5, in an exemplary embodiment, platform 22 is configured so that when tub 10 is in the second position, casters or wheels 18 are directly above portions of platform 22 so that tub 10 is substantially centered over platform 22. The greater surface coverage of platform 22 near corners 19 allows for increased stability, while the reduced surface coverage of intermediate portion 64 results in savings in materials and weight.

Thus, an assembly including tub 10 attached to a mobile support 12 is illustrated and described. It is also contemplated that mobile support 12 may be provided separately, as an after-market apparatus configured for attachment to a conventional wash basin or tub. Such a mobile support unit 12 may include, for example, actuator assembly 20, platform 22 and handle 50, with or without plate 24. A user would form the assembly by attaching the plate 24 or actuator assembly 20 to the bottom wall panel 14 of the tub 10 by using conventional fasteners, taking care to avoiding puncturing the bottom wall panel 14, as such puncturing may lead to leakage of tub 10.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus configured for attachment to a tub having a bottom wall and a plurality of wheels extending from the bottom wall, the apparatus comprising:
   a plurality of dual-hinged actuating mechanisms, at least some of the plurality of actuating mechanisms comprising:
      a first member configured to be fixedly positioned relative to the bottom wall;
      a second member; and
      a movable member comprising first and second ends, the first end hingedly attached to the first member and the second end hingedly attached to the second member; and
   a platform to which the second member is attached; and
   a handle fixed to the movable member, wherein the handle is movable in an arcuate path.

2. The apparatus of claim 1 further comprising a plate to which the first member is attached, wherein the plate is attached to the bottom wall.

3. The apparatus of claim 1 wherein the handle comprises:
a middle portion;
a left handle portion; and
a right handle portion; and
wherein the middle portion is fixed to the movable member.

4. The apparatus of claim 3 wherein the middle portion has a length greater than a width of the tub.

5. The apparatus of claim 1 wherein the movable member has a length that allows the platform to extend from the bottom wall by a greater distance than a distance the wheels extend from the bottom wall when the apparatus is attached to the tub.

6. The apparatus of claim 1 wherein the plurality of dual-hinged actuating mechanisms are configured to operate in unison.

7. An apparatus configured for placement upon a ground surface, the apparatus comprising:
a tub having a bottom wall and a plurality of wheels extending from the bottom wall;
a plurality of dual-hinged actuating mechanisms, at least some of the plurality of actuating mechanisms comprising:
a first member configured to be fixedly positioned relative to the bottom wall;
a second member; and
a movable member comprising first and second ends, the first end hingedly attached to the first member and the second end hingedly attached to the second member; and
a platform to which the second member is attached; and
a handle fixed to the movable member, wherein the handle is movable in an arcuate path.

8. The apparatus of claim 7 further comprising a plate to which the first member is attached, wherein the plate is attached to the bottom wall.

9. The apparatus of claim 7 wherein the handle comprises:
a middle portion;
a left handle portion; and
a right handle portion; and
wherein the middle portion is fixed to the movable member.

10. The apparatus of claim 9 wherein the middle portion has a length greater than a width of the tub.

11. The apparatus of claim 7 wherein the movable member has a length that allows the platform to extend from the bottom wall by a greater distance than a distance the wheels extend from the bottom wall.

12. The apparatus of claim 7 wherein the plurality of dual-hinged actuating mechanisms are configured to operate in unison.

13. The apparatus of claim 7 wherein the handle is movable between a first position and a second position, wherein:
at the first position, the plurality of wheels contact the ground surface; and
at the second position, the platform contacts the ground surface.

14. The apparatus of claim 13 further comprising a lock mechanism to retain the handle in the first or second position.

* * * * *